(12) United States Patent
Couckuyt et al.

(10) Patent No.: US 10,331,710 B2
(45) Date of Patent: Jun. 25, 2019

(54) PARTITIONING OF GEOGRAPHIC DATA

(71) Applicant: Microsoft Technology Licensing, LLC., Redmond, WA (US)

(72) Inventors: Jeffrey Darren Couckuyt, Bothell, WA (US); Joseph Schwartz, Redmond, WA (US); Sergey Y. Galuzo, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 470 days.

(21) Appl. No.: 15/042,115

(22) Filed: Feb. 11, 2016

(65) Prior Publication Data

US 2017/0097942 A1    Apr. 6, 2017

Related U.S. Application Data

(60) Provisional application No. 62/236,090, filed on Oct. 1, 2015.

(51) Int. Cl.
| | | |
|---|---|---|
| *G06F 17/30* | (2006.01) | |
| *G06F 16/29* | (2019.01) | |
| *G06F 16/951* | (2019.01) | |
| *G06F 16/22* | (2019.01) | |
| *G06F 16/25* | (2019.01) | |

(52) U.S. Cl.
CPC .......... *G06F 16/29* (2019.01); *G06F 16/2282* (2019.01); *G06F 16/25* (2019.01); *G06F 16/951* (2019.01)

(58) Field of Classification Search
CPC ....................................................... G06F 17/30
USPC ........................................................ 707/705
See application file for complete search history.

(56) References Cited

U.S. PATENT DOCUMENTS

| | | | |
|---|---|---|---|
| 6,950,828 B2 | 9/2005 | Shaw et al. | |
| 7,539,666 B2 | 5/2009 | Ashworth et al. | |
| 7,945,569 B2 | 5/2011 | Drory et al. | |
| 8,145,641 B2 | 3/2012 | Chatterjee et al. | |
| 8,244,772 B2 | 8/2012 | Aasman et al. | |
| 8,738,408 B2 | 5/2014 | Stewart et al. | |
| 8,782,055 B2 | 7/2014 | Johnson et al. | |
| 9,237,423 B1* | 1/2016 | Blaha, Jr. .............. | H04W 4/025 |
| 9,432,811 B2* | 8/2016 | De Lorenzo .......... | H04W 4/025 |
| 9,644,976 B2* | 5/2017 | Ding ...................... | G01C 21/30 |
| 9,904,932 B2* | 2/2018 | Fabrikant ................ | G06F 16/29 |
| 2002/0035432 A1 | 3/2002 | Kubica et al. | |
| 2002/0143462 A1 | 10/2002 | Warren | |

(Continued)

FOREIGN PATENT DOCUMENTS

WO    2008147348 A1    12/2008

OTHER PUBLICATIONS

"International Preliminary Report on Patentability Issued in PCT Application No. PCT/US2016/053688", dated Oct. 23, 2017, 8 Pages.

(Continued)

*Primary Examiner* — Kim T Nguyen
(74) *Attorney, Agent, or Firm* — Merchant & Gould

(57) ABSTRACT

Improving the efficiency of distributed database systems in providing geographically related information is provided by generating a data object identifier (ID) in association with geographical data. A geographical data object is received for storage in the distributed database system. A grid ID is generated based on spatial information contained in the geographical data object, a shardlet ID is generated indicating a shardlet location in a given shard on which the geographical data object is stored, and a sequence ID is generated indicating data placement within the shardlet location. The data object ID is assigned to the geographical (Continued)

data object, the data object ID comprising the grid ID, the shardlet ID, and the sequence ID.

19 Claims, 7 Drawing Sheets

(56) References Cited

U.S. PATENT DOCUMENTS

| | | |
|---|---|---|
| 2003/0206133 A1 | 11/2003 | Cheng |
| 2005/0055376 A1 | 3/2005 | Xie et al. |
| 2008/0228783 A1 | 9/2008 | Moffat |
| 2010/0114905 A1 | 5/2010 | Slavik et al. |
| 2012/0278344 A1* | 11/2012 | Berg ............... G06F 16/24552 707/754 |
| 2013/0215150 A1 | 8/2013 | Sokolov |
| 2013/0267252 A1* | 10/2013 | Rosenberg .............. H04W 4/02 455/456.3 |
| 2014/0149794 A1 | 5/2014 | Shetty et al. |
| 2015/0308843 A1* | 10/2015 | Ding ...................... G01C 21/30 701/411 |
| 2016/0037480 A1* | 2/2016 | Bellamkonda ........ H04W 4/029 455/456.2 |

OTHER PUBLICATIONS

"Spatial GeoRaster Developer's Guide", Published on: Jun. 20, 2012 Available at: http://docs.oracle.com/cd/B28359_01/appdev.111/b28398/geor_intro.htm.

Koo, Jawoo, "HCID: Grid Databases at Multiple Spatial Resolutions", In Publication of International Food Policy Research Institute, Aug. 6, 2010, 3 pages.

"International Search Report and Written Opinion Issued in PCT Application No. PCT/US2016/053688", dated Dec. 5, 2016, 14 Pages.

Weiner et al., "Scaling Pinterest", Available at: «https://qconsf.com/sf2012/dl/qcon-sanfran-2012/slides/MartyWeiner_and_YashwanthNelapati_ScalingPinterest.pdf», Nov. 9, 2012, 56 Pages.

\* cited by examiner

PARTITIONING OF GEOGRAPHIC DATA

CROSS-REFERENCE TO RELATED APPLICATIONS

This application claims priority from U.S. Provisional Application No. 62/236,090, filed Oct. 1, 2015, and entitled "Partitioning of Geographic Data," which is herein incorporated by reference.

BACKGROUND

Distributed databases may provide for storage of related data in multiple database devices that may be located in multiple remote locations. This may be particularly useful with data-intensive applications that store quantities of data which cannot typically be handled by a single database device. For example, it may be desirable to distribute data relating to geographical objects (roads, intersections, individual addresses, etc.) for mapping applications among multiple database devices. As the number of defined geographical objects desired to be stored may require various amounts of database memory, distributing the geographical objects across a distributed database comprising multiple database devices capable of handling data growth may be preferred. While generic distributed databases may be used to store such data, present systems may not provide for efficient association of data objects to the various databases they may be stored on.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Aspects of systems and methods are provided herein for generating a data object identifier (ID) in association with geographical data. A geographical data object is received for storage in the distributed database system. A grid ID is generated based on spatial information contained in the geographical data object, a shardlet ID is generated indicating a shardlet location in a given shard on which the geographical data object is stored, and a sequence ID is generated indicating data placement within the shardlet location. The data object ID is assigned to the geographical data object, the data object ID comprising the grid ID, the shardlet ID, and the sequence ID.

The details of one or more aspects are set forth in the accompanying drawings and description below. Other features and advantages will be apparent from a reading of the following detailed description and a review of the associated drawings.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout several views.

DETAILED DESCRIPTION

Figure 1:
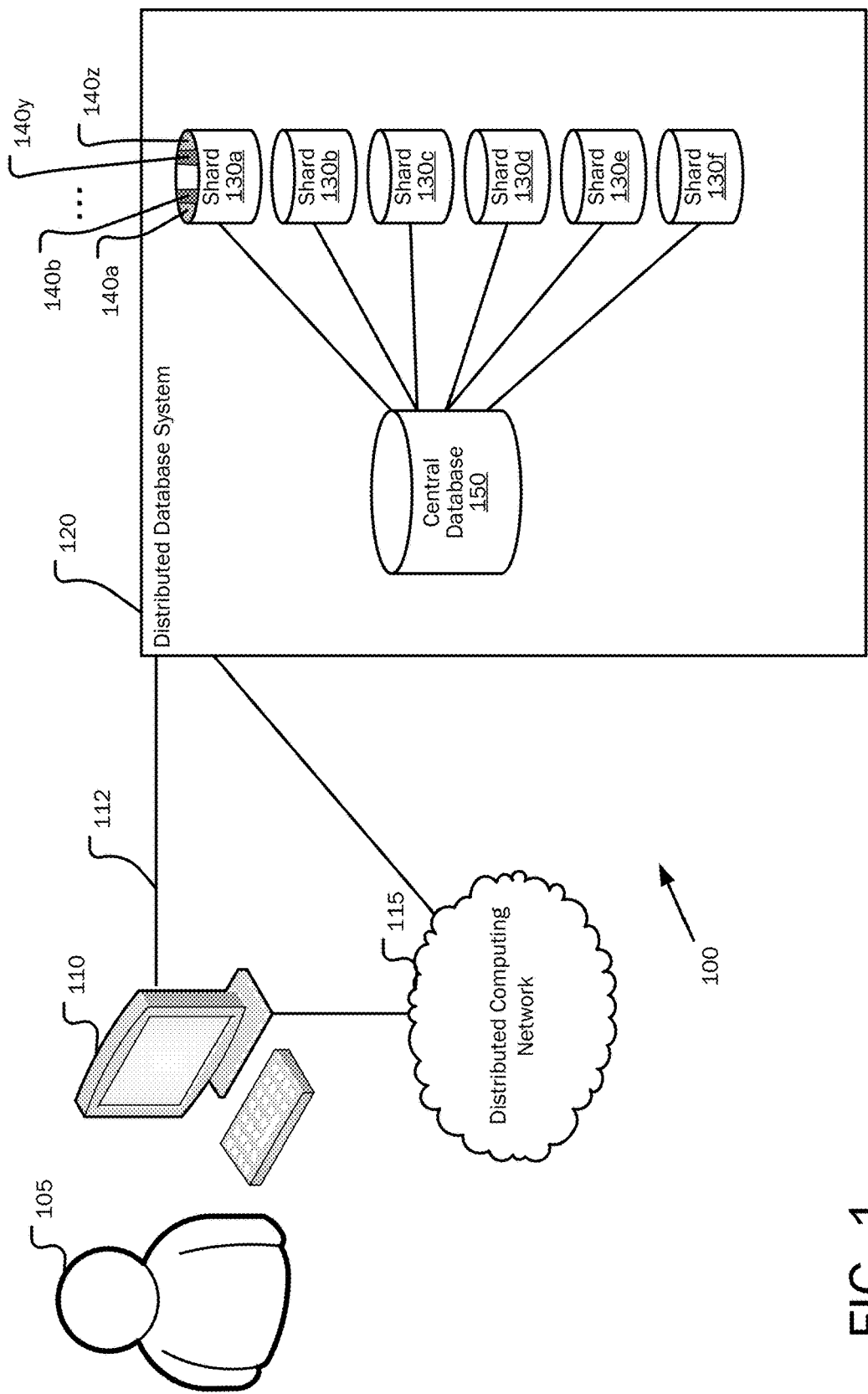
FIG. 1 is a block diagram illustrating a system for performing data object ID generation in a distributed database system.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is non-limiting, and instead, the proper scope is defined by the appended claims. Examples may take the form of a hardware implementation, or an entirely software implementation, or an implementation combining software and hardware aspects. The following detailed description is, therefore, not to be taken in a limiting sense.

For purposes of illustration and understanding, aspects disclosed herein are discussed with reference to data object identifier (ID) generation for geographical data objects to be added to a distributed database system. As will be appreciated from the disclosure set out herein, aspects of the present disclosure are useful with respect to distributed database systems containing append-only shards for data storage wherein the data may be stored and located by employing the generated data object ID. Specifically, the generated data object ID may be composed as a combination of three IDs. A grid ID is a spatially aware component of the generated data object ID. A shardlet ID is a partitioning component to assist with identifying the physical location of the stored data. A sequence ID is a sequential portion of the ID. Each of these components is discussed in further detail below.

In a distributed database system, it may be desired to write multiple pieces of data in multiple places for organizational and access purposes for readers of the data. With multiple readers accessing the distributed database system during write procedures, aspects of the present disclosure allow for providing efficient data storage and location for data stored in the distributed database system.

Aspects of the present disclosure provide efficient solutions for storing data objects (such as geographical data objects) in a plurality of databases (or shards) that make up a distributed database system. It should be understood that "shard" and "database" may be used interchangeably throughout the present disclosure. Shards have limits in the amount of storage available (for example, 1 terabyte (TB), 100 gigabytes (GB), etc.). When storing geographical objects that describe geographical data throughout the world, the amount of data may greatly exceed the storage limitations of a single shard. As such, many shards may be included in a distributed database system to handle the volume of data. It is desired to efficiently partition the data to be stored to allow for quicker storage and location of data.

Specifically, it may be desired to partition geographical data so that geographical data for a particular geographical location may be stored in a shard in close proximity to the geographic location. For example, if a user wishes to build a map of a particular location (e.g., Redmond, Wash.), it is desired for all of the applicable geographical data to be stored in the same shards. This avoids the distributed database system from having to search the entire system for each piece of data. Instead, a more targeted search may be employed to locate the data. This may be accomplished by having shards aligned with geographical boundaries.

However, certain aspects of pure geo-partitioning may be undesirable. For example, a distributed database system may store geographical objects associated with the United States in one shard and geographical objects associated with Asia in a separate shard. In certain mapping applications, there may exist much more geographical data for the United States than for Asia. As such, geo-partitioning may result in unequal use of database resources. In the above example, there may be two TBs of data for the United States and only 500 GBs of data for Asia, which may result in difficulties when the databases need to be married for map building purposes. Aspects of the present disclosure store geographic data in a geographically-agnostic way. For example, geographic data may be distributed amongst available shards in a round-robin fashion, regardless of the associated real world geography. This results in an even distribution of data across shard resources.

While shard distribution should be geographically-agnostic, aspects of the present disclosure provide additional efficiency within the individual shards. Within a particular shard, spatially related data are grouped together to provide efficiency within that shard to require fewer resources (e.g., processing power) to locate the desired geographical data. In other words, geographical data may still be partitioned spatially. Aspects of the present disclosure provide grid ID data as part of the generated data object ID to effectuate the partitioning, as discussed in greater detail below.

Aspects of the present disclosure assume that each piece of geographical data is stored only on a single shard. Selection of a given shard for storing a given piece of geographical data (i.e., a geographical data object) is performed by assigning each new geographical data object a next available sequential number, and selecting a shard for storage based on a modulus operation of the number of shards on the sequential number (e.g., $\mathrm{mod}_{2048}$ (sequential number) for 2048 shards). However, since geographical information provides specific detail, the shard assignment scheme described in the present disclosure also employs a generated data object ID to provide more efficient storage and location of geographic data.

For example, a grid ID may be generated for each piece of geographical data. The grid ID is a spatially aware component of the generated data object ID. The grid ID is used to group geographic data spatially within a shard. In aspects of the present disclosure, the grid ID may be associated with the physical geography of the Earth. For example, each set of grid coordinates may indicate an area equal to approximately a 0.1 degree to 0.1 degree space on the Earth. Thus, when a user requests information about Redmond, Wash., for example, only the grid ID values defining the Redmond, Wash. area need to be searched to locate the appropriate data. Such an approach limits the number of physical operations needed to search for data within the individual shards, which serves to increase overall efficiency of the distributed database system.

In aspects of the present disclosure, each shard may be comprised of a number of shardlets. For example, one shard may contain up to 2048 shardlets. However, in practice, there is little benefit to have all of the shardlets located at a single shard. An example application may employ between 10 and 100 shards, with each shard containing between 20 and 200 shardlets. Each shardlet may be viewed as a "moment" of data within the larger shard. Distributed database systems containing geographic data need to be able to scale-out relatively easily, as large updates of data will occur over time. Segmenting a shard into a number of shardlets helps with achieving this goal. When a shard can be viewed as a group of shardlets, the distributed database system can be broken down into a number of solvent shardlets. In other words, a shardlet becomes the minimum possible unit of distribution (i.e., a moment of data).

When a user wishes to read geographical data to build a map through a mapping application, a primary key may be used to look up the particular row in a shard where the desired geographical data are located. In aspects of the present disclosure, the generated data object ID will serve as that primary key. The primary key may be used as a key for index-organized tables or as the first component for a clustered key, such as used in a Structured Query Language (SQL) database. Rows of data may also be sorted by using the generated data object ID. As such, the generated data object ID may be used for efficient partitioning as well as ordering.

For example, the grid ID portion of the generated data object ID is a spatially aware component. When data are ordered in storage, the grid ID may be used to group shard rows roughly by geography. This ordering helps improve performance based on the assumption that users making geographic searches will want to retrieve rows that are near each other in geographic space. If geographic data can be stored near each other in geographic space, as well as, near each other in the memory of the shards, then the number of physical reads that are necessary to retrieve those records from memory may be greatly reduced. For example, if a user were to make a query regarding Redmond, Wash., the records may be accessed with a reduced number of operations because they are physically located together.

In aspects of the present disclosure, a user may upload geographical data concerning a particular geographic object (e.g., a road, intersection, individual addresses, etc.). When the distributed database system receives the new geographical data, a data object ID may be generated. For example, geographical data may include a location of a road. This location information is then used to generate the grid ID for the new geographical data object. The grid ID may be used as the first portion of the data object ID.

Once a grid ID is determined, a shardlet ID is generated for use in the data object ID. Using the same example of new geographical data defining a road, a shardlet ID is generated as an identifier of a shardlet within a particular shard. For example, if a shard is comprised of 100 shardlets, the shardlet ID will indicate which of the individual shardlets contains the new geographical data.

A mapping between shardlet IDs and shards may be maintained in a central database of the distributed database system. In other words, a shardlet ID allows the system to quickly identify the actual machine (shard) associated with the data object ID. A distributed database system may contain upwards of billions of data object IDs representing each of the stored geographical data objects.

In aspects of the present disclosure, a particular shardlet may contain multiple pieces of geographical data. For example, a shardlet may contain data identifying multiple roads including a newly added road. To accommodate this, a sequence ID is generated as the third part of the data object ID. The sequence ID provides a way to track multiple data objects within a particular shardlet identified by the shardlet ID.

The combination of the grid ID, the shardlet ID, and the sequence ID create the full data object ID for use as a primary key in storing and locating the new geographical data. In some aspects of the present disclosure, the total size of the full data object ID may be 64 bits. The grid ID uses M of these bits, for example, where M may be 11 in some aspects. Using more bits for the grid ID (i.e., a larger value for M) correlates with more precise grid location information, which allows for more precise spatial correlation in the distributed database system. Next, the shardlet ID uses N of these bits, for example, where N may be 11 in some aspects. Using more bits for the shardlet ID allows for more shardlets to be identified, which allows for a more granular data distribution within the distributed database system. The sequence ID uses the remaining bits of the original 64 bits (or other number of original bits in other aspects) after generation of the grid ID and the shardlet ID (i.e., 64-M-N), which in some aspects is 27 bits.

In some aspects of the present disclosure, the data object ID may be a primary key used in index organized tables (such as used in Oracle databases). In other aspects, the data object ID may be used as the first component of a clustered key (such as used in SQL databases). In either case, the data object ID may be used to sort stored geographical data objects by identifying the row in which the data are stored. This ordering may occur within a particular partition or may allow grouping of data objects by the geographical locations associated with the data objects. Each data object ID provides a unique identifier of each geographical data object.

This data object ID scheme allows for efficient partitioning and ordering of geographic data. The data object ID is used first to partition new geographical data as it is received in a distributed database system. Within each data partition (shardlet), the data object ID allows for ordering, as it provides a primary key to quickly refer to each data object within a partition.

Referring now to the drawings, FIG. 1 is a block diagram illustrating a system 100 for performing data object ID generation in a distributed database system according to aspects of the present disclosure. A user 105 is illustrated in association with a computer 110 with which the user 105 may operate a variety of software applications for reading information from and writing information to a distributed database system 120, for which the services of distributed database coordination as disclosed herein may be used.

As illustrated in FIG. 1, the computer 110 may communicate with distributed database system 120 via a direct data link 112 or via a distributed computing network 115, such as the Internet or a corporate or other entity intranet. The distributed database system 120 is illustrative of a collection of computer systems at which distributed database coordination may be applied. The distributed database system 120 may comprise any number of databases, such as shards 130a to 130f (generally, shards 130). Shards 130a to 130f may each be located remotely from one another. Each shard 130 may contain a number of partitions. For example, shard 130a may contain shardlets 140a to 140z (generally, shardlets 140).

The distributed database system 120 may further comprise a central database 150 in communication with shards 130a to 130f According to aspects of the present disclosure, the central database 150 may store metadata about the data objects stored in the distributed shards 130a to 130f One of the pieces of metadata in this central database 150 is a mapping of shardlet IDs to their corresponding shards 130.

As should be appreciated, the distributed database system 120 may be illustrative of one or more computing systems operating together as a backend data storage system for a company, educational system or other entity, or the distributed database system 120 may be illustrative of one or more computers or collections of computers operating in a cloud-based data center at which data object ID generation may be performed.

Shards 130a to 130f may be illustrative of general purpose data storage units or system for storage of geographical data objects sent by, accessed by, or otherwise communicated to or from the user 105 in association with partitioning received geographic data objects. Received inputs, for example, geographical data objects, may be stored in shards 130a to 130f, and associated mapping metadata for the assigned shardlet IDs may be stored in central database 150.

According to aspects, the components of the distributed database system 120 are illustrated and described above as a system of components operating remotely from a user's computer 110. That is, the components of the distributed database system 120 may operate as a standalone system of computing devices that may be called upon by a user's computer 110 for in association with data object ID generation as described herein.

The computer 110, the distributed database system 120, the shards 130a to 130f, the shardlets 140a to 140z, and the central database 150 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

Figure 2:
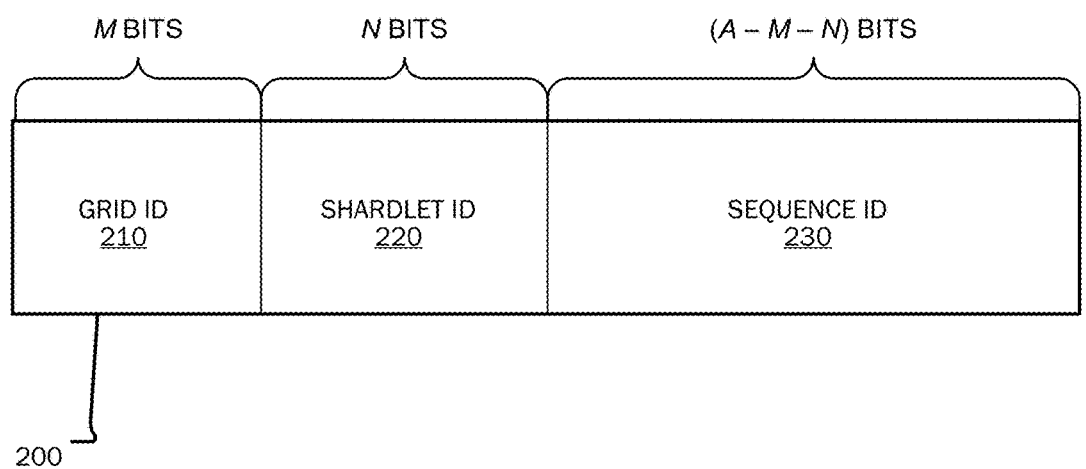
FIG. 2 illustrates an example data object ID according to aspects of the present disclosure.

FIG. 2 illustrates an example data object ID 200 according to aspects of the present disclosure. The data object ID 200 includes A available bits which are divided among a grid ID 210, a shardlet ID 220, and a sequence ID 230, and in some aspects A is 64 bits. For example, the first M bits of the data object ID 200 may contain the grid ID 210. The next N bits of the data object ID 200 may contain the shardlet ID 220. Finally, the final (A-M-N) bits may contain the sequence ID 230. As will be appreciated, by assigning more bits for the grid ID 210, a finer correlation to the geographic location may be achieved, and by assigning more bits to the shardlet ID 220, more shardlets 140 may be identified in a given configuration of a data object ID 200.

Figure 3:
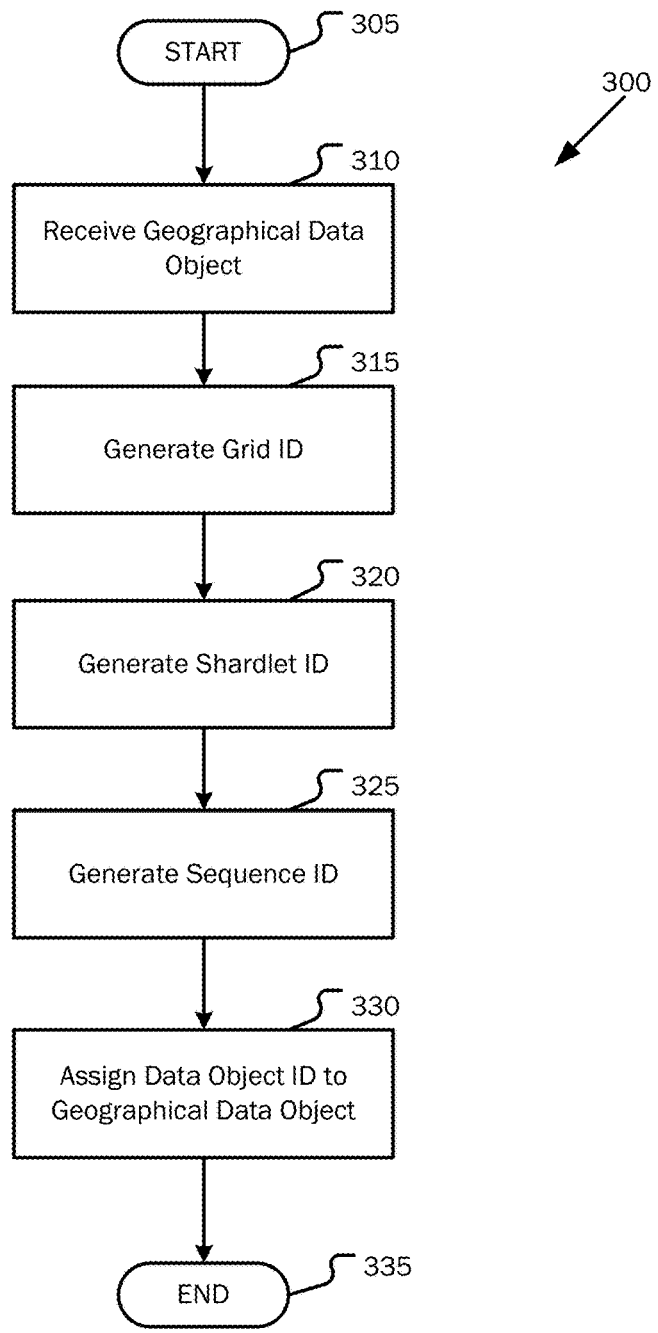
FIG. 3 is a flowchart showing general stages involved in an example method for data object ID generation for distributed database storage.

Having described an example architecture and other aspects of the present disclosure above with reference to FIG. 1 and FIG. 2, FIG. 3 is a flowchart showing general stages involved in an example method for partitioning and ordering received geographical data in a distributed database system 120. As mentioned above, aspects of the present disclosure may be used for improving the efficiency of partitioning and the organizational functionality of a distributed database system 120. For purposes of description, the methods set out below are described in terms of updating a distributed database system 120 comprising geographical data, but the description of these aspects with respect to geographical data should not be taken as limiting, but for purposes of illustration and description only.

Referring then to FIG. 3, the method 300 begins at start operation 305 and proceeds to operation 310 where a geographic data object is received from a particular user, such as user 105, who provides geographical data to be stored in the distributed database system 120. For example, the user 105 may provide information comprising a number of geographical objects (such as roads) to the distributed database system 120. For example, the geographical data may be stored in the distributed database system 120 for the purpose of being used by a mapping application to allow users to build maps of targeted geographical areas.

At operation 315, the grid ID 210 is generated for each received geographical data object. As the geographical data objects contain specific geospatial information, the grid ID 210 is generated based on this specific geospatial information. In aspects of the present disclosure, the grid ID may be based on geospatial information corresponding to the center of the geographical data object. As discussed above, up to M bits are used for the grid ID 210, where the more bits used correlates with more a precise spatial correlation. For example, a particular geographical data object may be defined as being located in a particular 0.1 degree by 0.1 degree square area when using M=28. As such, all geographical data objects centered in the same 0.1 degree by 0.1 degree square area may be assigned the same grid ID 210. If fewer bits were used however, a larger, and thus less precise, area than 0.1 degree by 0.1 degree would be used to assign grid IDs 210 to geographical data objects, and more geographical data objects would potentially be assigned the same grid ID 210.

At operation 320, the shardlet ID 220 is generated. In some aspects of the present disclosure, where N=11, the shardlet ID 220 may run from 0 to 2047, indicating the shardlet location within a particular shard 130 having up to 2048 shardlets 140. As discussed above, N bits are used for the shardlet ID, where a greater number of bits used correlates with more granular data distribution (i.e., more shardlets 140 per shard 130).

At operation 325, the sequence ID 230 is generated. In aspects that use 64-bit data object IDs 200, the sequence ID 230 comprises the number of bits equaling 64 bits minus the lengths of the grid ID 210 and the shardlet ID 220. As the distributed database system 120 tracks which geographical data objects within a shard 130 have the same grid ID 210, the sequence ID 230 may be calculated to provide an ordering of data objects within a shard 130, such that geographical data objects with the same grid ID 210 may be ordered by physical proximity. For example, once the grid ID 210 and the shardlet ID 220 are generated, then a lookup may be performed to determine the next available sequence ID 230 corresponding to the particular grid ID 210 and shardlet ID 220 combination.

At operation 330, the grid ID 210, the shardlet ID 220, and the sequence ID 230 are combined to create a data object ID 200, which is assigned to the geographical data object. In other words, the output for each received geographical data object is a data object ID 200 associated with the geographical data objects. In aspects of the present disclosure, the data object IDs 200 are permanently assigned, so that when an object is added to the database, it will have the same data object ID 200 for its lifetime. If a need arises to grow the distributed database system 120, more shards 130 may be added without requiring the reassignment of previously assigned data object IDs 200. The method 300 concludes at end operation 335.

Figure 4:
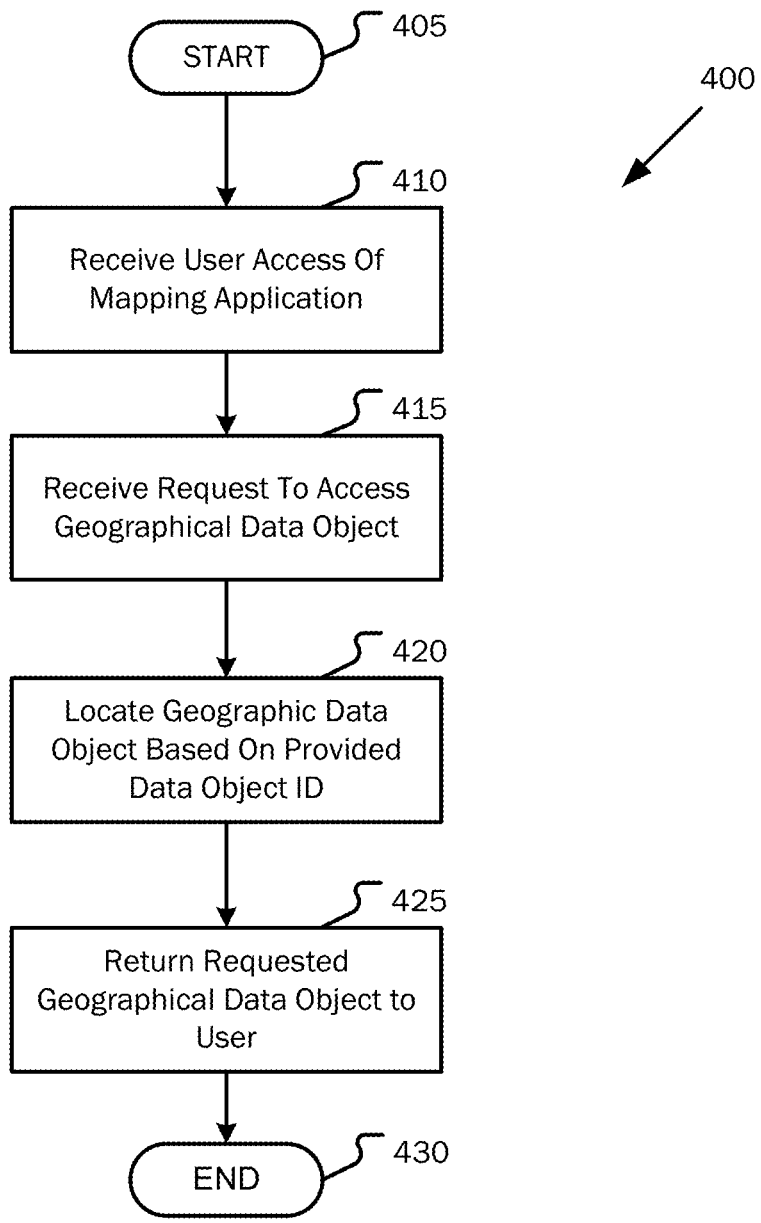
FIG. 4 is a flowchart showing general stages involved in an example method for data object location using a generated data object ID in a distributed database system.

Having described an example architecture and other aspects of the present disclosure above with reference to FIG. 1 and FIG. 2, FIG. 4 is a flowchart showing general stages involved in an example method for using a generated data object ID 200 for locating geographical data objects. As mentioned above, aspects of the present disclosure may be used for efficient location of geographical objects in a distributed database system 120 to improve the efficiency of the distributed database system 120.

Referring then to FIG. 4, the method 400 begins at start operation 405 and proceeds to operation 410 where the distributed database system 120 receives an access request from a user, such as user 105, who may access a mapping application. In some aspects, the "user" may be subsystems operating within the mapping application. For example, the user may wish to search for a road that was previously added to the distributed database system 120. At operation 415, the distributed database system 120 receives a request to access a particular geographic data object, for example, the user may make a request to access the geographical data object associated with the road. If the user knows the corresponding data object ID 200, then the distributed database system 120 may immediately and directly access the geographical data object. Prior systems may require searching all machines in the distributed database system 120 to locate this information, whereas aspects of the present disclosure eliminate such inefficient searching, as the shardlet ID 220 directly identifies the machine on which the desired data are stored by reference with a shardlet ID 220 to shard map maintained at the central database 150.

Of course, it may be unlikely that the user directly knows the data object ID 200. Instead, the user may only know a general geographical area in which the road physically exists. In that case, the user request may be in the form of a bounding box or coordinates. For example, the user may enter "Redmond, Wash." as a search term. The search term defines a boundary in which a certain number of coordinates corresponding to grid IDs 210 exist. For example, the geographical boundaries of "Redmond, Wash." may include 100 grid coordinates that correspond to 100 grid ID 210 numbers.

At operation 420, the distributed database system 120 locates all geographical data objects corresponding to the grid IDs 210 implicated by the search boundary box, and at operation 425, returns the requested geographical data objects to the requesting user. Method 400 concludes at end operation 430.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which aspects are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
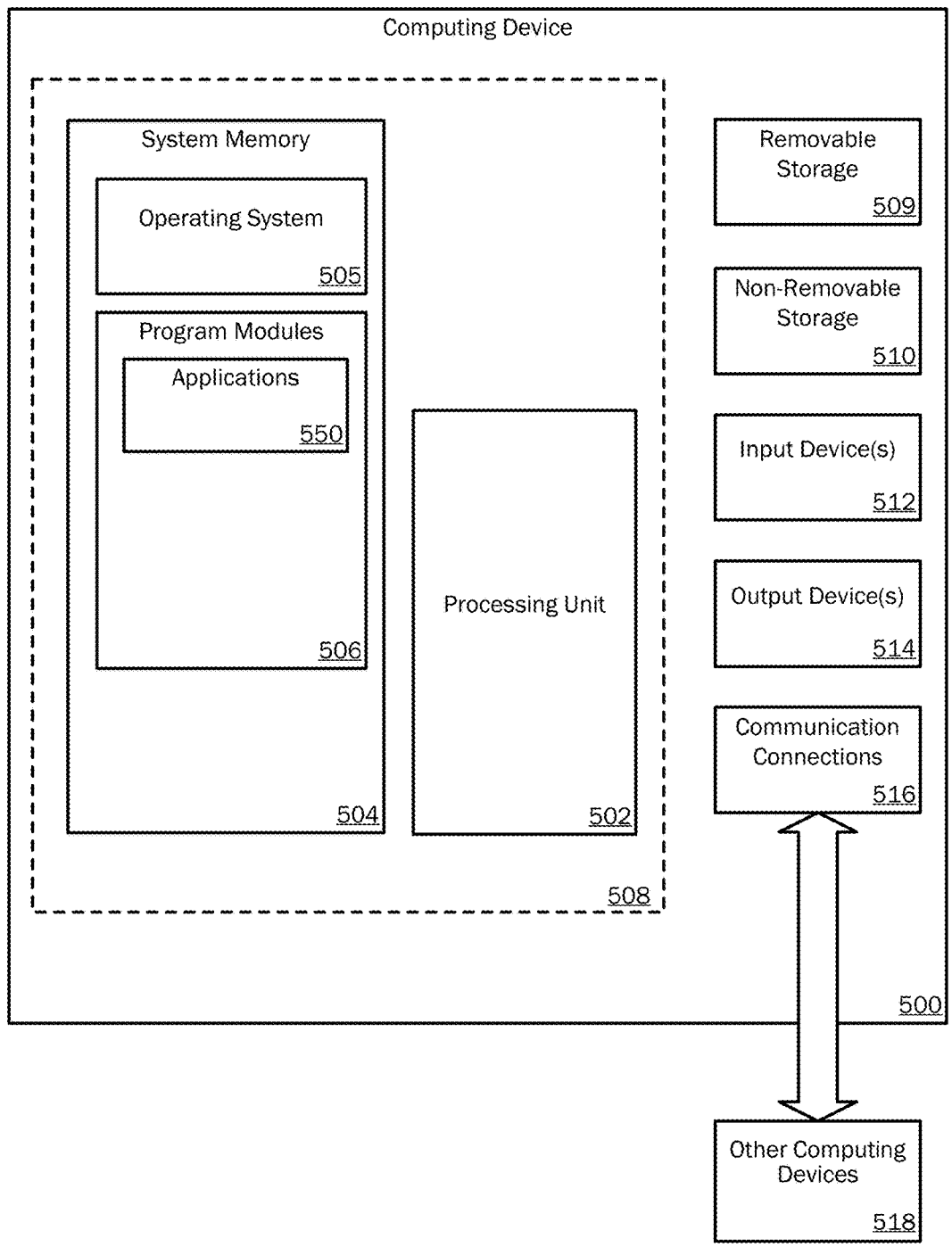
FIG. 5 is a block diagram illustrating one example of the physical components of a computing device.

FIGS. 5-6 and the associated descriptions provide a discussion of a variety of operating environments in which aspects of the present disclosure are practiced. However, the devices and systems illustrated and discussed with respect to FIGS. 5-6 are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure can be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the software for generating data object IDs. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., software for generating data object IDs) performs processes including, but not limited to, one or more of the stages of the methods 300 and 400 illustrated in FIGS. 3 and 4. According to an aspect, other program modules may be used in accordance with examples of the present disclosure and include applications such as electronic mail and contacts applications, word processing applications, spreadsheet applications, database applications, slide presentation applications, drawing or computer-aided application programs, etc.

Aspects of the present disclosure are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc., are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, RF transmitter, receiver, and/or transceiver circuitry, universal serial bus (USB), parallel, and/or serial ports.

The term computer readable media as used herein includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery media or transmission media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

Figure 6A:
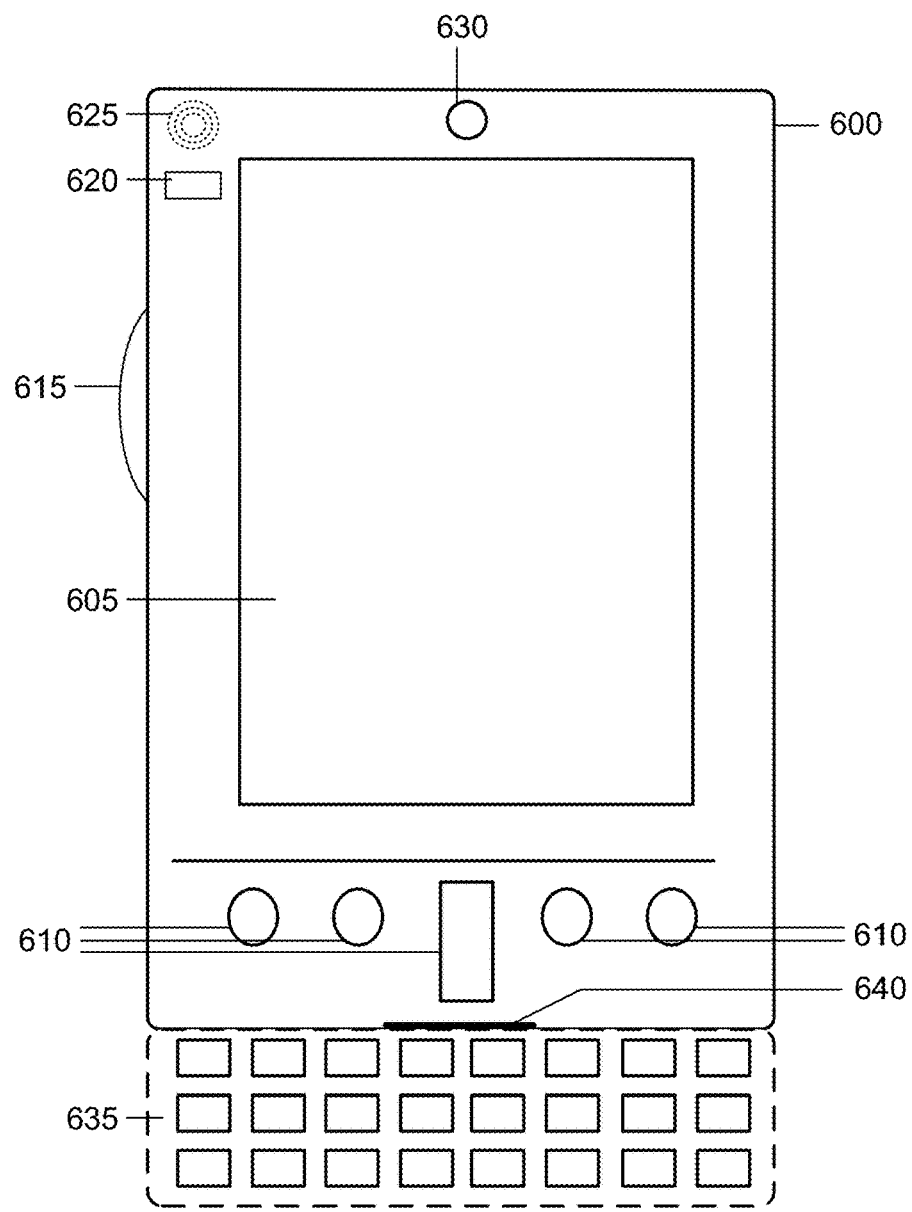
FIGS. 6A and 6B are block diagrams of a mobile computing device.
Figure 6B:
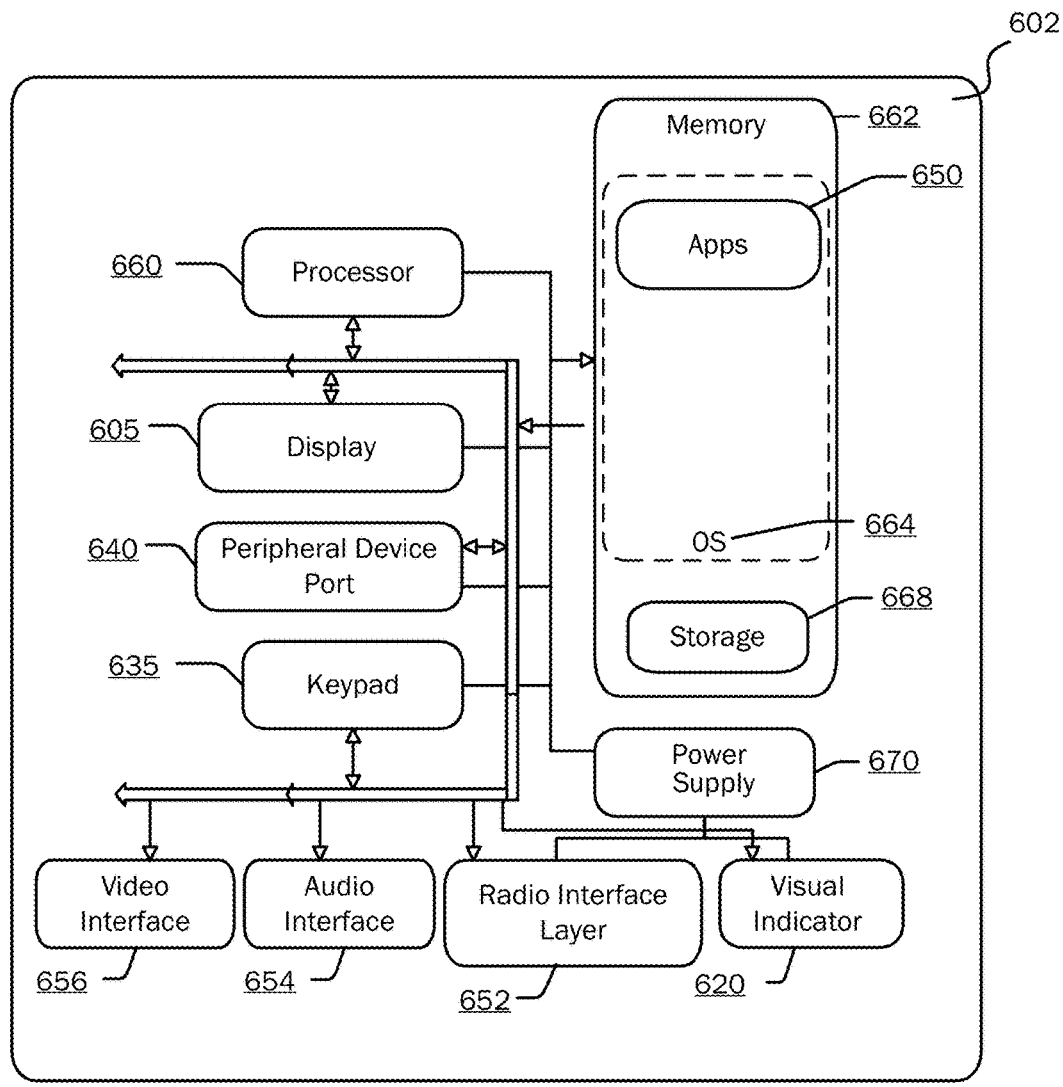

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, software for executing data object ID generation is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 652 that performs the function of transmitting and receiving radio frequency communications. The radio 652 facilitates wireless connectivity between the system 602 and the "outside world," via a communications carrier or service provider. Transmissions to and from the radio 652 are conducted under control of the operating system 664. In other words, communications received by the radio 652 may be disseminated to the application programs 650 via the operating system 664, and vice versa.

According to an aspect, the visual indicator 620 is used to provide visual notifications and/or an audio interface 654 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 654 is used to provide audible signals to and receive audible signals from the user. For example, in addition to being coupled to the audio transducer 625, the audio interface 654 may also be coupled to a microphone to receive audible input, such as to facilitate a telephone conversation. According to an aspect, the system 602 further includes a video interface 656 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 652 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 652 or via a distributed computing network. Similarly, according to an aspect, such data/information are readily transferred between computing devices for storage and use according to well-known data/information transfer and storage means, including electronic mail and collaborative data/information sharing systems.

Aspects of the present disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure as claimed in any way. The aspects, examples, and details provided in this application are considered sufficient to convey possession and enable others to make and use the best mode claimed. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for improving efficiency of storage and retrieval of geographic data in a distributed database system by generating a data object identifier (ID), the method comprising:
   receiving a geographical data object for storage in the distributed database system, the distributed database system comprising a plurality of shards;
   generating a grid ID based on spatial information contained in the geographical data object;
   storing the geographical data object in a shard of the plurality of shards based on the grid ID;
   generating a shardlet ID indicating a shardlet location in the shard where the geographical data object is stored;
   generating a sequence ID indicating data placement of the geographical data object within the shardlet location;
   assigning the data object ID to the stored geographical data object, the data object ID comprising the grid ID, the shardlet ID, and the sequence ID; and
   in response to receiving a request from a user to access the stored geographical data object, retrieving the stored geographical data object from the distributed database system based on the data object ID.

2. The method of claim 1, wherein the distributed database system comprises a plurality of append-only shards.

3. The method of claim 2, further comprising:
   assigning the geographical data object a next available sequential number; and
   selecting a shard from the plurality of append-only shards for storage of the geographical data object based on a modulus operation of a number indicating how many shards are in the plurality of append-only shards and the next available sequential number.

4. The method of claim 3, further comprising generating the shardlet ID based on the grid ID to thereby spatially partition geographical data within the selected shard.

5. The method of claim 1, wherein the grid ID is associated with a physical geography of Earth.

6. The method of claim 5, wherein the grid ID corresponds to an area comprising a 0.1 degree by 0.1 degree space on Earth.

7. The method of claim 1, further comprising ordering a plurality of geographical data objects including the geographical data object in the shard where the geographical data object is stored based on respective data object IDs for each of the plurality of geographical data objects.

8. The method of claim 1, further comprising:
   mapping between a plurality of shardlet IDs and the plurality of shards; and
   storing shardlet mapping information in a central database system residing in the distributed database system.

9. The method of claim 1, wherein the data object ID comprises 64 bits.

10. The method of claim 9, wherein the grid ID comprises 28 bits of the data object ID.

11. The method of claim 9, wherein the shardlet ID comprises 11 bits of the data object ID.

12. The method of claim 9, wherein the sequence ID comprises 27 bits of the data object ID.

13. The method of claim 1, further comprising generating the sequence ID as a next available sequential sequence ID number corresponding to a combination of the grid ID and the shardlet ID.

14. A method for improving efficiency of storage and retrieval of geographic data in a distributed database system by generating a data object identifier (ID), the method comprising:
   receiving a search request from a mapping application, wherein the search request defines a geographical area;
   translating the geographical area to a plurality of grid IDs; and
   retrieving a plurality of geographical data objects from the distributed database system, the distributed database system comprising a plurality of shards in which the plurality of geographical data objects are stored, wherein a retrieved geographical data object is identified by a data object ID comprised in part of a grid ID from the plurality of grid IDs, the data object ID having been generated upon receipt of the geographical data object for storage in the distributed database system by:
      generating the grid ID based on spatial information contained in the geographical data object;
      storing the geographical data object in a shard of the plurality of shards based on the grid ID;
      generating a shardlet ID indicating a shardlet location in the shard where the geographical data object is stored;
      generating a sequence ID indicating data placement of the geographical data object within the shardlet location; and
      assigning the data object ID to the stored geographical data object, the data object ID comprising the grid ID, the shardlet ID, and the sequence ID.

15. The method of claim 14, further comprising using the data object ID as a primary key for the distributed database system, wherein the distributed database system comprises index organized tables.

16. The method of claim 14, further comprising using the data object ID as a first component of a clustered key for the distributed database system, wherein the distributed database system comprises SQL databases.

17. The method of claim 14, further comprising maintaining the data object ID as a sole data object ID for the geographical data object for a lifetime of the geographical data object.

18. A system for improving efficiency of storage and retrieval of geographic data in a distributed database system by generating a data object identifier (ID), the system comprising:
   a plurality of append-only shards, each storing a plurality of geographical data objects;

a central database, storing a mapping of a plurality of shardlet IDs to the plurality of append-only shards where a first geographical data object is stored;

a processor, configured to execute instructions, the instructions comprising:

receiving the first geographical data object for storage in the distributed database system;

generating a grid ID based on spatial information contained in the first geographical data object;

storing the first geographical data object in an append-only shard of the plurality of append-only shards based on the grid ID;

generating a shardlet ID indicating a shardlet location in the append-only shard where the first geographical data object is stored;

generating a sequence ID indicating data placement of the first geographical data object within the shardlet location;

assigning a data object ID to the stored first geographical data object, the data object ID comprising the grid ID, the shardlet ID, and the sequence ID; and in response to receiving a request from a user to access the stored first geographical data object, retrieving the stored first geographical data object from the distributed database system based on the data object ID.

19. The distributed database system of claim 18, wherein the plurality of append-only shards are located remotely from one another.

* * * * *